United States Patent Office 3,226,522
Patented Dec. 28, 1965

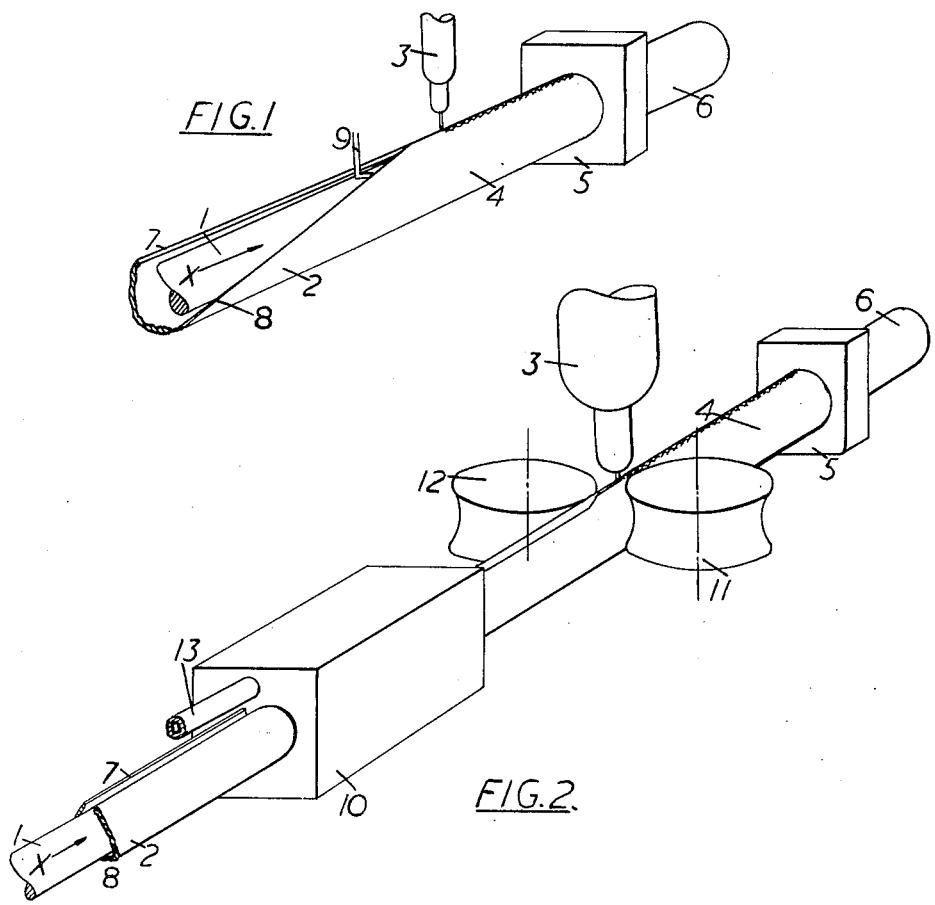

3,226,522
WELDING OF ELECTRIC CABLES
Gordon Kenneth Duddridge and Anthony John Millard, Aldwych, London, England, assignors to International Standard Electric Corporation, New York, N.Y., a corporation of Delaware
Filed June 28, 1963, Ser. No. 291,481
Claims priority, application Great Britain, July 20, 1962, 28,060/62
1 Claim. (Cl. 219—60)

This invention relates to a method of manufacturing electric cables.

In the manufacture of electric cables it is sometimes necessary to weld a metal tube round a core of conductors or steel wires. One method of welding the metal tube round a core is to fold a metal strip round the core and to weld the edges by an inert gas shielded electric arc. The weld produced in this manner has been found unreliable because the inert gas sometimes does not prevent oxidation of the metal at the weld on the inside of the tube.

It is an object of the present invention to provide a method of welding a metal tube round a core by an inert gas shielded electric arc which provides welds having improved reliability.

According to the present invention there is provided a method of manufacturing an electric cable which includes the step of feeding an inert gas into a folded metal strip formed to contain a core and welding the edges of the metal strip by an inert gas shielded electric arc to form a metal tube containing the core.

In the accompanying drawings which show embodiments of the present invention:

FIG. 1 is a view of a cable core having a folded metal strip argon arc welded round it whilst argon is being fed by a pipe to the inside of the metal strip.

FIG. 2 is a view of a further embodiment of a cable core having a folded metal strip argon arc welded round it whilst argon is being fed to the inside of the metal strip by a device which also aligns the strip edges for welding.

FIG. 3 is an end view of the argon feeding device in FIG. 2, and

FIG. 4 is a sectional side view along AA of FIG. 3.

Referring now to FIG. 1 there is generally shown a cable core 1 of stranded high tensile steel wires moving in the direction of arrow X and having a copper strip 2 folded round it to form a loose fitting tube. The edges of the copper strip 2 are argon arc welded by an argon arc welding device 3 to form a loose fitting tube 4 round the core 1. The loose fitting tube 4 is finally reduced in cross-section by a die 5 to form a tightly fitting tube 6 round the core 1.

The longitudinal edges 7 and 8 of the copper strip 2 are folded in a known manner to abut against one another before they are welded together and just before they meet a pipe 9 blows a jet or argon into the space between the copper strip 22 and the core 1. The pipe 9 directs the argon jet towards the argon arc welding device 3 so that when the copper strip 2 is at the welding position a blanket of argon gas prevents oxidation of the inner portion of the edges 7 and 8. When the copper strip 2 has been welded the argon fed by the pipe 9 is trapped inside the loose fitting tube 4, but at the die 5 the loose fitting tube is reduced on to core 1 and so a small portion of the argon enters the strant interstices while the major portion of the argon is pushed back and out between the edges 7 and 8 of the copper strip 2. The pushing back of the argon by the die 5 causes the argon trapped at the weld position to be mixed with fresh argon from the pipe 9.

Referring now to FIGS. 2, 3 and 4 where like numerals to those in FIG. 1 indicate the same devices, the argon gas is fed in between the edges 7 and 8 of the copper tape 2 by a block 10 and the edges 7 and 8 are held in abutment by rollers 11 and 12 whilst the argon arc welding device 3 welds them together.

The block 10 has an argon inlet pipe 13 connected to a passage 14 which feeds the argon to a number of outlet passages 15 in a fin 16. The fin 16 extends radially inwards in a bore 17 which is a slide fit with the folded copper tape 2.

In operation the core 1 is fed in the direction of arrow X and has the copper tape 2 welded round it and reduced on to it in the same manner as in FIG. 1 except that in this embodiment the argon gas is fed by the pipe 13 along the bore 14 and out of the passages 15. As the copper tape 2 is drawn through the block 10 the edges 7 and 8 slide along the sides of the fin 16 whilst argon is passed into the fold by the passages 15. The fin 16 and the bore 17 act as a guide for the copper strip 2 and ensure that the edges 7 and 8 do not wander from the welding line.

If a second argon arc welding device is placed between the welding device 3 and the die 5 and this second welding device is used to repair any imperfections in the weld made by the welding device 3 then the argon that is pushed back by the die 5 will escape from the imperfection and prevent a porous repair weld being made through oxidation of the welded metal.

It is to be understood that the foregoing description of specific examples of this invention is not to be considered as a limitation on its scope.

What we claim is:

Apparatus for manufacturing an electric cable comprising a block, said block comprising a central bore, an offset bore, passages connecting said offset bore to said central bore, means introducing a cable core into said central bore, means introducing a metal strip about said cable core within said central bore and folding said strip longitudinally about said core, means feeding an inert gas into said offset bore and through said passages into said folded metal strip and means for welding the edges of said metal strip by an inert gas shielded arc to form a continuous metal sheathed cable.

References Cited by the Examiner
UNITED STATES PATENTS

| | | | |
|---|---|---|---|
| 2,029,044 | 1/1936 | Westlinning | 113—33 |
| 2,654,014 | 9/1953 | Schaefer | 219—60 |
| 2,716,692 | 8/1955 | Williams et al. | 219—60 |
| 2,760,044 | 8/1956 | Mott | 219—60 |

RICHARD M. WOOD, *Primary Examiner.*